United States Patent [19]

Koch et al.

[11] Patent Number: 5,259,323
[45] Date of Patent: Nov. 9, 1993

[54] MOUNTING ARRANGEMENT AND METHOD FOR GANGWAY BELLOWS FOR GANGWAYS OF ARTICULATED VEHICLES

[75] Inventors: Robert Koch, Bad Sooden-Allendorf; Knud Mosaner, Kassel, both of Fed. Rep. of Germany

[73] Assignee: Hubner-Gummi - Und Kunststoff, Kassel, Fed. Rep. of Germany

[21] Appl. No.: 779,862

[22] Filed: Oct. 21, 1991

[30] Foreign Application Priority Data

Feb. 21, 1991 [DE] Fed. Rep. of Germany ....... 4105449

[51] Int. Cl.5 ............................................. B61O 17/22
[52] U.S. Cl. ........................................ 105/20; 160/395
[58] Field of Search ............................ 105/8.1, 18, 20; 280/420; 160/383, 392, 395

[56] References Cited

U.S. PATENT DOCUMENTS

| | | | |
|---|---|---|---|
| 2,282,063 | 5/1942 | Keys et al. | 105/20 |
| 2,287,667 | 6/1942 | Brown | 160/392 X |
| 2,834,412 | 5/1958 | Velke | 160/395 |
| 4,538,523 | 9/1985 | Koch | 105/20 |
| 4,567,832 | 2/1986 | Koch | 105/20 |
| 4,788,806 | 12/1988 | Sease | 160/395 X |

FOREIGN PATENT DOCUMENTS

| | | | |
|---|---|---|---|
| 2489678 | 3/1982 | France | 160/395 |
| 3837 | 2/1906 | United Kingdom | 160/395 |

Primary Examiner—Robert J. Oberleitner
Assistant Examiner—S. Joseph Morano
Attorney, Agent, or Firm—Fiddler, Levine & Mandelbaum

[57] ABSTRACT

A gangway bellows for fastening to the end of a vehicle, the bellows having a clamping cable along its peripheral edge which cooperates with a channel carried by the end of the vehicle for attaching the end of the bellows to the vehicle. A connecting strip of elastic material, such as rubber, extends along the peripheral edge of the bellows and embraces the clamping cable. The connecting strip is located between the clamping cable and the channel on the vehicle and serves to resiliently clamp the cable to retain the latter within the channel.

18 Claims, 2 Drawing Sheets

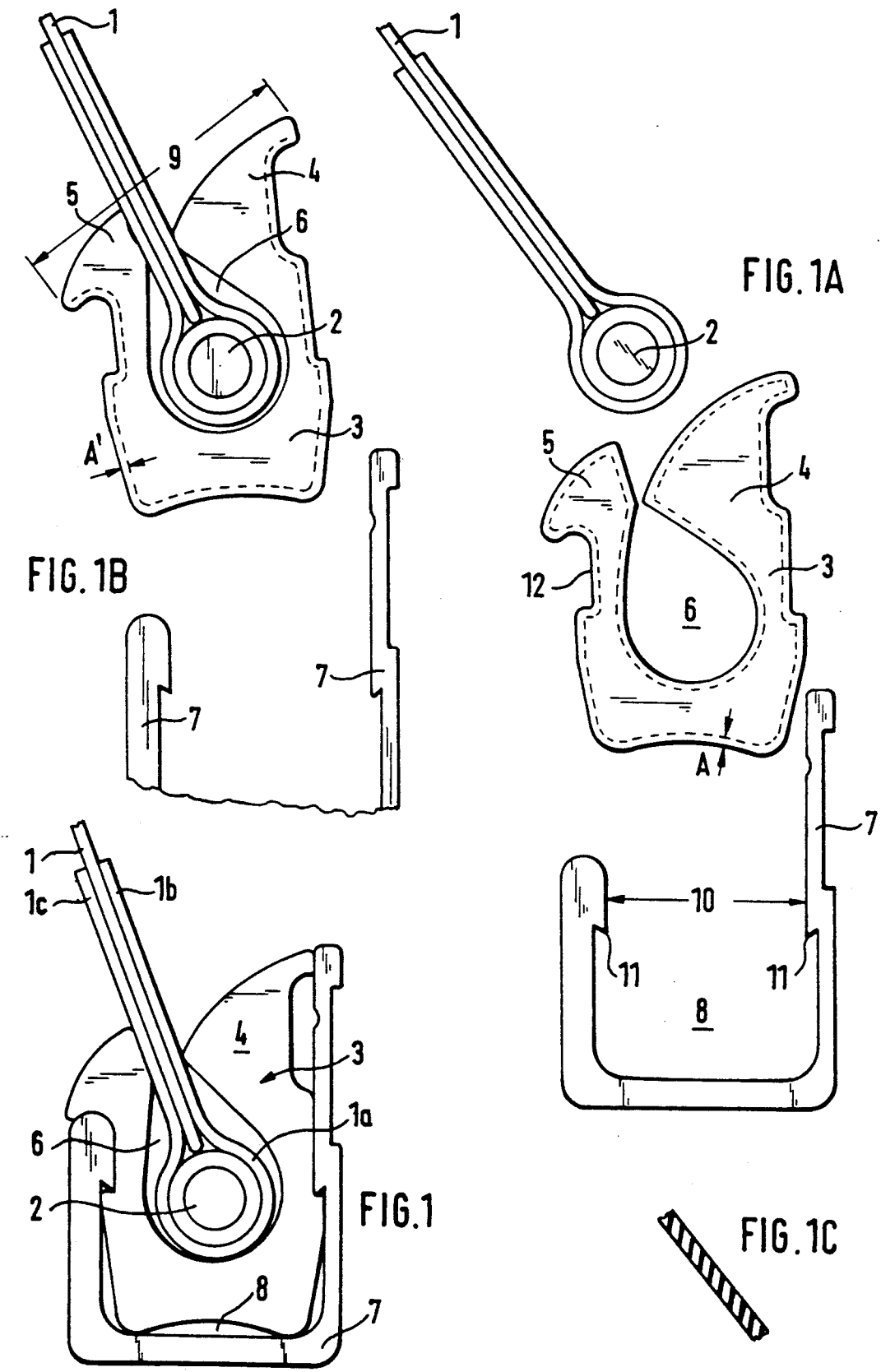

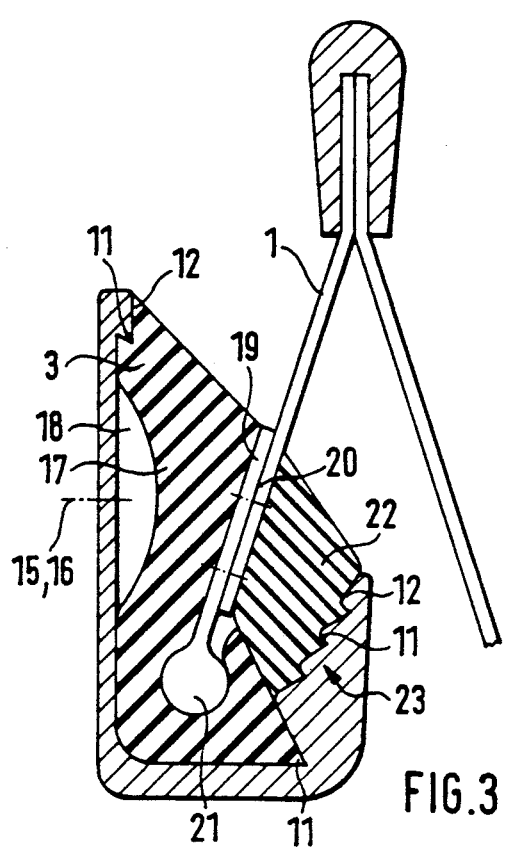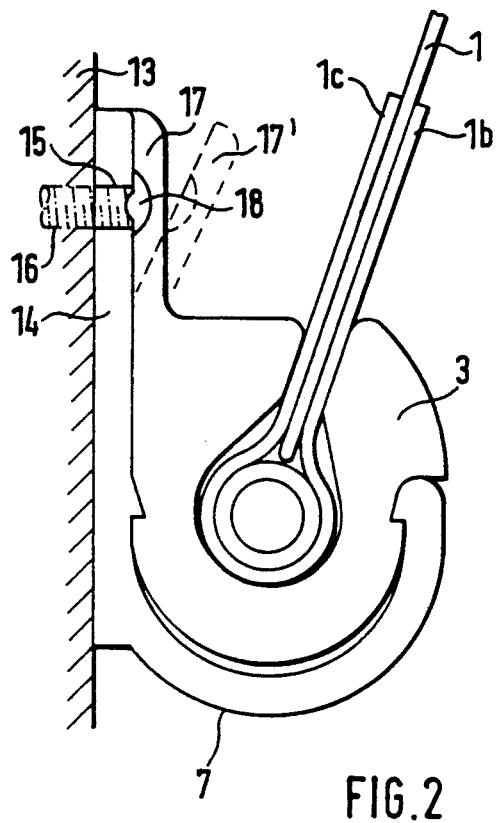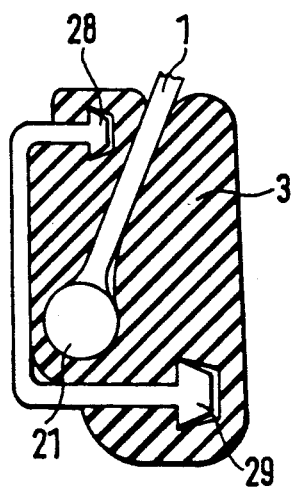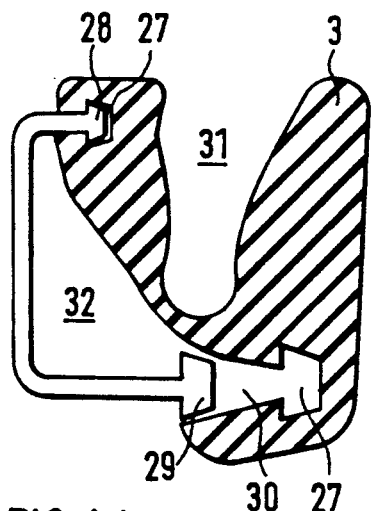

MOUNTING ARRANGEMENT AND METHOD FOR GANGWAY BELLOWS FOR GANGWAYS OF ARTICULATED VEHICLES

It is generally customary in articulated vehicles, particularly when they serve for the transport of people, to surround the gangway between two vehicles, which are connected in an articulated fashion with one another, with a gangway bellows, so that persons can change over from one vehicle to the other while protected from the effects of the environment. The gangway bellows essentially comprise a fabric, which is coated on both sides and folded, so that the gangway bellows can absorb the movements of the two vehicles relative to one another, without interfering significantly with these relative movements. At each end, the gangway bellows is placed around a cable. which runs around the periphery of the bellows, and the ends of the cable are connected to a lock. In the open position of the lock, the end of the bellows can be placed in a channel-shaped connecting or retaining profile which is located around the passage opening in the end face of the respective vehicle. In the closed position of the lock, the cable ends are brought together to such a degree, that the cable and the end of the bellows can no longer be lifted out of the channel formed by the connecting or retaining profile.

Optionally, the end of the bellows, which envelops the cable, is supported by way of a sealing strip in the channel, in order to prevent penetration of environmental influences, in the region of the bellows connection, into the gangway region that is surrounded by the bellows. This arrangement now increasingly creates difficulties with modern vehicles, the cross sections of which increasingly are deviating from an oval shape and approaching a rectangular shape. The problem is presented since the bellows are to follow the vehicle profile as accurately as possible even in the case of these more angular vehicle profiles, as may frequently be desirable for various reasons. In the four corner regions, the clamping cable is bent with an extremely small radius, so that with the clamping lock closed, the pressure of the clamping cable on the connecting profile is concentrated in an extremely small area. Such a concentration of the pressure can lead to the destruction of the inserted seal and of the bellows wall around the cable and finally lead to failure of the clamping cable. It has become known that when such damage occurs in practice, it has been possible to make do with putting cushion-shaped padding under the clamping cable in the edge regions. Since articulated vehicles with angular profiles increasingly are coming into use or have already come into use, such emergency measures do not represent an acceptable solution in the long run.

It is an object of the invention to overcome the cause for the aforementioned damage in such a manner that it is not necessary to work with improvised measures to prevent damage, and that the gangway bellows can be disposed satisfactorily and reliably, under operating conditions, on the vehicle, even if the latter is rather angular. "Angular" vehicles are understood to be vehicles, the cross section of which in the gangway region between two vehicles, coupled together in an articulated manner, essentially has a rectangular shape, that is, in which the gangway regions between roof and floor on the one hand and sidewalls on the other form transitional curves with only very small radii of curvature. Moreover, in their connecting regions, the gangway bellows largely follow this contour, whether it be that the cross sectional contour of the bellows and the vehicle coincide in the region of the bellows connection or whether it be that the cross sectional contours correspond to one another, but lie concentrically within the other, the cross section of the bellows being smaller than that of the vehicle in the connecting region. In the case of the situation described last, the contour of the cross section of the vehicle is, of course, not so very important and the correspondence of the contours of the bellows and the vehicle is not an absolute prerequisite for the invention, because what matters is that the clamping cable is guided in the form of a rectangle with corners, which are, at most, rounded off a little. Less attention is given to the case in which the shapes of the cross section of the vehicle and that of the clamping cable guiding system deviate from one another, that is, the case in which the cross sectional shape of the vehicle is more oval whereas the shape of the clamping cable guiding system is an exact rectangle with corners rounded off only a little. This is because should such a situation occur in practice, at best in exceptional circumstances, the real problem has its origin in the contour of modern vehicles, which just happens to be angular at the present time.

The invention will be further explained with reference to the accompanying drawings, in which:

FIG. 1 is a diagrammatic cross-sectional view of the connection between the end of a bellows and a connecting or retaining profile of a vehicle end face, according to the invention;

FIG. 1A is an exploded view of the parts shown in FIG. 1;

FIG. 1B is a view similar to FIG. 1 showing the parts just before the end of the bellows is inserted into the connecting or retaining profile;

FIG. 1C is a fragmentary cross-sectional view of the bellows material;

FIG. 2 is a diagrammatic cross-sectional view of another embodiment of the bellows-vehicle connection according to the invention;

FIG. 3 is a diagrammatic cross-sectional view of still another embodiment of the bellows-vehicle connection according to the invention;

FIG. 4A is a diagrammatic cross-sectional view of yet another embodiment of the retaining profile and rubber connector for the end of the bellows according to the invention, before the end of the bellows is associated with the connector; and FIG. 4B is a view similar to FIG. 4A showing the end of the bellows and the rubber connector joined together within the retaining profile.

The embodiments of FIGS. 1 and 2 are conceived primarily for the case in which the problem described in detail above, namely the problem with conventionally constructed bellows, which are already in use, is to be eliminated, that is, the problem of retrofitting conventional bellows. The bellows wall ends in a strip 1, which is taken in the simplest manner around the clamping cable 2. The cable can be made of steel and can be received in a turnbuckle which serves as a lock as described above. A connection strip 3 is slipped onto the edge of the gangway bellows in order to be held on its by tension or a clamping action. Thereafter, the gangway bellows is inserted, with the connecting strip, into the channel formed in the retaining profile 7. When a turnbuckle is used on the cable, this is done while the clamping cable 2 has a maximum length, i.e., when the turnbuckle is open. The turnbuckle can be then closed to shorten the clamping cable 2. Optionally, the channel formed in the profile 7 may be only partially filled by the connecting strip 3 and a sealing strip 22 can be inserted to fill the remaining crosssectional region of the profile with compression of the connecting strip 3 as shown in FIG. 3. The section of the strip, which is taken around the clamping cable, is permanently connected with the strip 1 by sewing, gluing, etc. The clamping cable 2 thus is within a loop, which is formed directly by the bellows wall.

In the embodiment shown, this solution is modified only in as much as a separate loop 1a is provided, which surrounds the clamping cable 2 and which lies with end brackets 1b, 1c on both sides of the bellows strip 1. The two end brackets 1b, 1c are firmly and permanently connected with the strip 1 that lies between them.

A connector strip 3 of an inherently appreciably elastic material, such as rubber, is disposed on the end of the bellows, which in cross section, that is, when viewed perpendicularly to the end face of the vehicle, describes a rectangle with corners that are rounded off slightly. The bellows itself comprises a fabric, which is coated on both sides, as is indicated in FIG. 1C of the drawing. On the other hand, the connector strip 3 consists entirely of rubber or of a material with the properties of rubber. With two lips 4, 5, the connector 3 defines a channel 6. When not installed and there is no tension on the connector strip, the opposite regions of the lips 4 and 5 have largely approached one another (see FIG. 1A). For slipping the connector strip 3 on the end region of the bellows, with its end strip 1 that is characterized by the clamping cable 2 and the loop 1a, the lips 4 and 5 are propped open which elastically tensions them, the end of the bellows is introduced into the channel 6, and as the propping force is released, the lips 4 and 5 approach one another so that they lie against and grip the end of the bellows.

In FIG. 1A, the connector strip 3 of the bellows, still separate from the bellows 1 and not yet inserted in the retaining profile 7, is shown in the tension-free state. In FIG. 1B, the same connector strip is shown after it is disposed on the gangway bellows but while it is still outside of the retaining profile 7 with a residual tension in the lips 4 and 5 gripping the bellows end. Finally, in FIG. 1, the end profile is disposed on the bellows and inserted in the retaining profile 7, which is mounted on an end wall of a vehicle.

When joined to the bellows but before insertion into the retaining profile 7 (FIG. 1B), the connecting strip 3 still has a certain oversize A' compared to the dimensions of the channel 8 that is defined by the retaining profile 7, although this oversize A' is less than the oversize A in the initial state. This oversize must be reduced to such an extent by pressure on the strip 3, that the bellows with the strip 3 can be introduced into the retaining profile 7, in order to relax thereafter. A small residual tension remains, so that the strip 3 is seated without play in the retaining profile 7 (FIG. 1). The strip 3 is held between the walls of the retaining profile 7 so that the residual tension, present in lips 4 and 5 in FIG. 1B, is increased and the lips are additionally pressed against the gangway bellows. The distance 9 between the outer surfaces of the lips 4 and 5 after the edge profile is slipped onto the gangway bellows but before it is inserted in the retaining profile 7 (FIG. 1B) is larger than the distance 10 between the corresponding surface regions of the retaining profile.

To secure the edge profile 3 further in the retaining profile 7, the mutually facing surfaces of the two profiles are provided with friction-increasing means, which are mutually cooperating cleats 11 and grooves 12 of the two profiles.

The arrangement of FIG. 2 differs from that of FIG. 1 basically only owing to the fact that the angular contours of connecting strip 3' and retaining profile 7' are rounded off. In FIG. 2, parts or sections of parts similar to those of FIG. 1 have been provided with the same reference symbols followed by a prime. Particular emphasis is placed on the possibility of mounting the retaining profile on the vehicle 13. The side of the retaining profile 7', which is opposite the gangway bellows 1 and facing the vehicle 13, is constructed to have a relatively large area and to be flat, in order to be supported on a wall of the vehicle. This pronounced flange 14 is provided with holes 15, which are distributed over the length of the flange and through which screws 16 are passed in order to fasten the retaining profile 7' to the vehicle 13. The strip 3' is provided with a lug 17, which lies with a certain tension against the flange 14, in order to cover the fastening means 15, 16. In order to make the fastening means 15, 16 accessible, it is merely necessary to force the lug 17 away from the flange 14, as is indicated by the broken line 17' in FIG. 2. In the region of the fastening means 15, 16, the lug 17 can be provided with depressions 18, in order to have the lug lie with the largest area possible flush on the flange.

An embodiment, suitable especially for new gangway bellows, is shown in FIG. 3. An end batten 19, which comprises a battenshaped section 20 and a cable 21 which is molded to the free end of section 20, is permanently disposed here on the last strip 1 of the gangway bellows. For the solutions of FIGS. 1 and 2, the clamping cable 2 preferably consists of metal and only in exceptional cases of a different material such as a rubber cable. Moreover, a turnbuckle is provided, so that a rubber cable is extensible only within limits. On the other hand, cable 21 is a metal cable only in exceptional cases and usually is a rubber cable, which is endless and is extensible to the extent that it can be lifted over the edge of the retaining profile 7" that is opposite the vehicle and, at the same time, additionally extended elastically. After it is inserted in the channel of the retaining profile 7", it still retains such a residual tension that it is able to keep the gangway bellows in the channel of the retaining profile under normal stresses.

Before the insertion in the retaining profile 7", the gangway bellows is provided with a connecting strip 3", which is put over the clamping cable 21. The gangway bellows, provided in this way with a connecting strip and completed, is inserted into the retaining profile 7". Once again, friction increasing means in the form of cleats 11" and grooves 12" act between the external surface of the connecting strip 3" and the internal surface of the retaining profile 7". If the gangway bellows is inserted with its connecting strip 3" in the channel of the retaining profile 7", this channel is not yet filled up and so a sealing strip 22 is added.

After insertion of strip 22, the latter is under tension between the end strip 1 of the gangway bellows and an opposite wall section 23 of the retaining profile 7", which previously had still remained free and consists in all embodiments throughout of a rigid material, preferably a metal and particularly aluminum. The tension on the sealing strip 22 forces the end section of the end strip 1 of the gangway bellows, with interpositioning of the actual batten-shaped section 20 of the end batten 19, against the cheek of the retaining profile 7" that is fixed on the vehicle. In turn, the sealing strip 22 is supported at the wall section 23, in which, as with the associated wall of the sealing strip 22, grooves 12" and cleats 11" cooperate with one another. Here, however, the grooves 12" and cleats 11" are constructed to have a saw-tooth shape, so that the sealing strip 22 can be pressed into the space between the strip 1 of the gangway bellows and the wall section 23 without employing much force; however, it can be dismantled again only with the use of considerable force. With this arrangement also, a lug-shaped section 17 arches over the fastening means 15, 16 for the retaining profile. The latter, however, serves primarily for fixing the connecting strip 3" in the retaining profile 7". The outer surface 24 of the end profile 7", which faces the gangway bellows, is continued on the other side of the end strip 1 of the gangway bellows essentially continuously in the outer surface 25 of the sealing strip 22.

In comparison to the retaining profile 7", the strip 3", is elastic to a high degree, while the sealing strip 22 in this respect lies between the retaining profile 7" and the connecting strip 3". In other words, strip 22 is more elastic than the retaining profile 7, but less elastic than the end profile 3".

A further development of the arrangement of FIG. 3 is shown in FIGS. 4A and 4B. However, compared to the previous embodiment, this arrangement is closer to the state of the art. The arrangement of FIG. 4 lies between the preceding embodiment and the known arrangements, because the connecting strip 33, which is in one piece, is disposed on the gangway bellows, while the gangway bellows 1 are disposed on the retaining profile 7. The connecting strip 33 of the elastically yielding, rubber-like material of FIGS. 4A and 4B is provided with two longitudinal grooves 26 and 27, with which the connecting strip 33 can be slipped onto headlike expanded end cleats 28 and 29, which lie outside of the retaining profile 77 (FIG. 4A). Initially, the end cleat 28 is caused to penetrate the longitudinal groove 26, while the end cleat 29 is caused to penetrate only barely a section 30 of the longitudinal groove 27, which is neck-shaped or funnel-shaped in cross section. The longitudinal groove 27 thus is still outside of the region of the end cleat 29 of the connecting strip 33. In this situation, which is shown in FIG. 4A, the end of the gangway bellows, which is constructed as shown in FIG. 3, is brought with clamping cable 21 into a groove 31 of the strip 33, the tension on which has been largely relieved.

If the gangway bellows with the clamping cable 21 have come to a stop against the appropriately rounded out bottom of groove 31 and if the pressure, which has brought this about, continues to act and is appropriately increased, the strip 33 is forced into the channel 32 of the retaining profile and, in particular, the end batten 29 enters the longitudinal groove 27, so that the strip 33 is held under tension in and on the retaining profile 77 and the gangway bellows are held at the end face of the vehicle (FIG. 4B).

The end strip 1 of the gangway bellows, on which the clamping cable 21 is disposed directly or in a manner corresponding to FIG. 3, is held over an appreciable portion of its width in the connecting strip 33, so that a reliable fixation is accomplished. The oversize of the end profile in the tension-relieved state and relative to the internal contour of the retaining profile ensures a tension in the connecting strip 33 in its end position, so that this strip 33 cannot be separated from the retaining profile 77 by normal operating stresses and correspondingly higher forces must be employed to disassemble it.

Accordingly, for the arrangement of FIGS. 4A and 4B and, to a lesser extent, also for the arrangement of FIG. 3, the clamping cable 21 no longer has the function of stretching the bellows with respect to the retaining profile. The clamping cable is more of a thickened end of the end strip 1, in order not only to hold this by friction between its lateral surfaces and the corresponding surfaces of the strip 33 but also to prevent inadvertent intervention.

We claim:

1. Apparatus for fastening a gangway bellows to a vehicle, comprising
    cable means circumferentially connected to one end of said bellows,
    retaining profile means mounted on said vehicle in a region whereat said bellows is to be fastened, and
    connecting strip means attached to said cable means, said connecting strip means being made of a resilient compressible material for being compressibly received and captured within said profile means and having opposing lips defining a channel in which said cable means is disposed with said lips engaging said bellows a sufficient distance from said cable means for enclosing said channel about the entire circumference of the cable means.

2. Apparatus according to claim 1 wherein said connecting strip means is disposed along the whole of the periphery of said one end of said gangway bellows.

3. Apparatus according to claim 1 wherein said connecting strip means is removably clamped onto said bellows about said cable means by the resilient clamping action on said compressible material.

4. Apparatus according to claim 1 wherein said connecting strip means has an external side with friction-increasing means adapted to engage said retaining profile means for resisting separation of said connecting strip means and said retaining profile means.

5. Apparatus according to claim 4 wherein said friction-increasing means comprises cooperative cleat means and groove means.

6. Apparatus according to claim 1 wherein said retaining profile means has a width slightly narrower than a corresponding width of said connecting strip means and said connecting strip means is compressibly stresses as it is received in said retaining profile means.

7. Apparatus according to claim 6 wherein said retaining profile means has a cross section defining an interior channel with an angular wall and said connecting strip means has a cross section with an outer circumference which is correspondingly angular.

8. Apparatus according to claim 6, wherein said retaining profile means has a cross section defining an interior channel with a substantially circular wall and said connecting strip means has a cross section with an outer circumference which is substantially circular.

9. Apparatus according to claim 8 wherein said retaining profile means circular wall has a projection with a flat surface and said connecting strip means has a complementary recess for receiving said projection.

10. Apparatus according to claim 8 wherein said retaining profile means has walls enclosing an essentially rectangular open channel, said walls terminating in thickened portions.

11. Apparatus according to claim 1 wherein said retaining profile means, when unstressed, has an interior channel with a cross section having at least one dimension smaller than the corresponding dimension of the cross section of said connecting strip means when the latter is unstressed.

12. Apparatus according to claim 1 wherein said gangway bellows comprises a coated fabric, said connecting strip means comprises an elastic material and said retaining profile means comprises an aluminum alloy.

13. Apparatus according to claim 1 wherein said retaining profile means and said connecting strip means are contoured to permit penetration of said connecting strip means into said retaining profile means with less force than is needed to separate said connecting strip means from said retaining profile means.

14. Apparatus according to claim 1 wherein said connecting strip means has a smaller cross section than said retaining profile means and further comprising sealing strip means disposed in a portion of the interior of said retaining profile means which is unoccupied by said connecting strip means, said sealing strip means being deformable under pressure for being received in said unoccupied portion of said retaining profile means.

15. Apparatus according to claim 1 wherein said cable means comprises a steel cable and further comprising a turnbuckle means in which said cable means is received.

16. Apparatus according to claim 1 wherein said cable means comprises an endless rubber cable.

17. A method of connecting a gangway bellows to a vehicle comprising clamping a connecting strip means having lips defining a first channel onto the edge of said gangway bellows over a clamping cable, inserting said gangway bellows with said clamping cable and connecting strip means into a second channel in a retaining profile means mounted on said vehicle with said clamping cable at its maximum length thereby compressing said lips to engage said bellows a sufficient distance from said cable for enclosing said first channel about the entire circumference of the cable, and then closing a turnbuckle connected to said clamping cable to shorten said clamping cable and thereby tensioning it about said retaining profile means.

18. A method according to claim 17 further comprising slipping said connecting strip means onto the end of said gangway bellows before insertion into said second channel, and inserting a sealing strip means into said second channel.

* * * * *